(12) United States Patent
Breuer et al.

(10) Patent No.: US 12,225,502 B2
(45) Date of Patent: Feb. 11, 2025

(54) METHOD FOR CO-ORDINATION OF PAGING IN A USER EQUIPMENT (71) Applicant: THALES DIS FRANCE SAS, Meudon (FR)

(72) Inventors: Volker Breuer, Boetzow (DE); Ly-Thanh Phan, Le Plessis Robinson (FR); Benoît Jouffrey, Saint-Cyr-sur-Mer (FR)

(73) Assignee: THALES DIS FRANCE SAS, Meudon (FR)

( * ) Notice: Subject to any disclaimer, the term of this patent is extended or adjusted under 35 U.S.C. 154(b) by 370 days.

(21) Appl. No.: 17/777,316

(22) PCT Filed: Nov. 18, 2020

(86) PCT No.: PCT/EP2020/082459
§ 371 (c)(1),
(2) Date: May 17, 2022

(87) PCT Pub. No.: WO2021/099342
PCT Pub. Date: May 27, 2021

(65) Prior Publication Data
US 2022/0408406 A1 Dec. 22, 2022

(30) Foreign Application Priority Data

Nov. 19, 2019 (EP) .................................. 19306483

(51) Int. Cl.
*H04W 68/02* (2009.01)
*H04W 88/06* (2009.01)

(52) U.S. Cl.
CPC ............ *H04W 68/02* (2013.01); *H04W 88/06* (2013.01)

(58) Field of Classification Search
CPC .............................. H04W 68/02; H04W 88/06
See application file for complete search history.

(56) References Cited

U.S. PATENT DOCUMENTS

| | | | |
|---|---|---|---|
| 9,094,928 B2 * | 7/2015 | Mathias | H04W 60/06 |
| 10,559,177 B2 * | 2/2020 | Feldman | G08B 13/24 |
| 11,356,842 B2 * | 6/2022 | Lovlekar | H04W 48/18 |
| 11,632,739 B1 * | 4/2023 | Tran | H04W 68/02 370/329 |

(Continued)

FOREIGN PATENT DOCUMENTS

| | | | | |
|---|---|---|---|---|
| CN | 103563428 B | * | 4/2017 | H04L 5/0092 |
| CN | 109076345 A | * | 12/2018 | H04B 1/3816 |

(Continued)

OTHER PUBLICATIONS

International Search Report (PCT/ISA/210) and Written Opinion (PCT/ISA/237) mailed on Jan. 26, 2021 by the European Patent Office as the International Searching Authority for International Application No. PCT/EP2020/079640082459—[14 pages].

*Primary Examiner* — Adam D Houston (57) ABSTRACT

Provided is a method to operate a user equipment communicatively connected to at least two subscriber identity modules, which are at least assigned to a first and a cellular network, wherein the user equipment has assigned an independent paging identity in each of the first and second cellular networks for registration in said cellular networks. Other embodiments disclosed.

16 Claims, 3 Drawing Sheets (56) References Cited

U.S. PATENT DOCUMENTS

| | | | |
|---|---|---|---|
| 2009/0215472 A1 | 8/2009 | Hsu | |
| 2012/0258707 A1* | 10/2012 | Mathias | H04W 60/06 |
| | | | 455/426.1 |
| 2013/0331054 A1* | 12/2013 | Kodali | H04W 36/00224 |
| | | | 455/437 |
| 2015/0230196 A1* | 8/2015 | Sen | H04W 60/00 |
| | | | 370/328 |
| 2015/0334673 A1* | 11/2015 | Mathias | H04W 76/18 |
| | | | 455/426.1 |
| 2023/0134552 A1* | 5/2023 | Kim | H04W 60/04 |
| | | | 370/329 |
| 2023/0284304 A1* | 9/2023 | Lee | H04L 65/1016 |
| | | | 370/329 |

FOREIGN PATENT DOCUMENTS

| | | | | |
|---|---|---|---|---|
| CN | 114731620 A | * | 7/2022 | H04W 60/005 |
| EP | 3826386 A1 | * | 5/2021 | H04W 68/00 |
| KR | 20240078249 A | * | 6/2024 | |
| WO | WO-2016164808 A1 | * | 10/2016 | H04B 7/155 |

* cited by examiner

METHOD FOR CO-ORDINATION OF PAGING IN A USER EQUIPMENT

FIELD OF THE INVENTION

The present invention relates to a method to operate a user equipment. The invention also pertains to a user equipment using said method.

The invention further relates to method for a cellular network capable of operating a user equipment. The invention also pertains to a cellular network using said method.

BACKGROUND OF THE INVENTION

Generally, in the field of wireless communication it is getting more and more widespread to offer user equipments being able to be coupled with two or more subscriber identity modules, typically provided by different cellular network operators. Often such user equipments are equipped with just one transceiver circuitry and one or sometimes also two protocol stack instances. However as there is only one transceiver circuitry therefore such user equipment can at a time operate in only one of the cellular networks.

However there is a demand to be reachable in both cellular networks. Reachability in a network for incoming calls is ensured by listening to certain occasions and channels containing the paging i.e. an indication that there is a network oriented (mobile terminated) connection attempt. For that purpose the user equipments have means to switch between both networks. By this paging occasions from both networks can be detected. This general approach also applies to user equipments with more than two subscriber identity modules.

A problem occurs, if the paging window for the user equipment is overlapping for both cellular networks. This is all the more disadvantageous for user equipments with reduced paging cycle, like IoT user equipments.

Especially for the case that one transceiver circuitry is shared for the communication/reception with/from two cellular networks, the need for paging co-ordination, in particular due to paging overlapping can apply.

In that case at the time when the user equipment is operating with the one cellular network, it cannot be paged by the other, and vice versa.

To solve that situation of overlapping paging windows by being available in the first cellular network and for the next paging occasion in the second cellular network would be disadvantageous. This is in particular the case due to the serving network applies certain paging strategies i.e. paging in the serving cell, in the area and finally in the whole network. Already today sometimes paging occasions may be missed due to bad radio conditions. Moreover a device switching between overlapping paging and the network not being aware that the device is not listening would naturally enlarge its pagings with respect to geography and hence consume more resources and cause more interference. The network could page in the last known serving cell, if no response received including all cells in proximity and page in these in addition page in the area and finally may even page in the whole core network.

Furthermore with long paging cycles as typical for IoT devices such approach is not feasible, as a remote equipment which is trying to reach the user equipment would in one half of the trials not be successful. Paging occurrence depends on DRX cycle duration by enlarging the DRX cycle to eDRX missing such a paging due to overlap would be even more disadvantageous. eDRX cycle may be up to 45 minutes (Cat-M), resp. 3 hours (NB-IoT). According to 3GPP large eDRX cycles are achieved by multiplying the SFN (system frame number), i.e. each 10 ms frame has a number lasting from 0 to 1023, i.e. up to 10.24 seconds, by introducing the HSFN (Hyper-SFN) being a 10 bit multiplier so that for Cat-M eDRX timer of 1024×10.24 seconds, i.e. 43 min are achieved. NB-IoT uses 2 bits more for SFN hence up to 3 hours of eDRX cycles can be achieved.

In fact, also the probability for overlap reduces with DRX cycle duration, but if it would occur, it would be a very severe issue.

In addition for IoT devices power consumption is a very important fact, even though paging overlap could be considered as unlikely. It is to consider that an interruption in deep sleep causes a remarkable power consumption, in particular as the paging occasions are asynchronous, i.e. the first network has its paging occurrence at a certain time. Afterwards the user equipment can enter in deep sleep, however some time later the second cellular network has its paging occasion, consequently the user equipment needs to abort the deep sleep again and listen to the second network. Afterwards it can/could enter into deep sleep but paging may occur during that time/some time later in the first cellular network.

This indicates that a coordination would be beneficial not only for avoiding overlap and interference but also for timing coordination, for minimizing power consumption, even for IoT devices where overlap is rather not so likely.

Hence it requires a solution for avoiding the paging overlapping situation for user equipments with two subscriber identification modules and improve the overall paging situation for optimizing power consumption.

It is therefore the goal of present invention to overcome the mentioned disadvantages and to propose a solution for an improved handling of user equipments with multiple subscriber identification modules.

Further alternative and advantageous solutions would, accordingly, be desirable in the art.

SUMMARY OF THE INVENTION

For this it is according to a first aspect of the invention suggested a method to operate a user equipment according to claim 1. It is further suggested according to a second aspect of the invention a user equipment according to claim 7. In a third aspect of the invention it is proposed a method for a cellular network according to claim 12.

According to the first aspect of the invention it is proposed a method to operate a user equipment communicatively connected to at least two subscriber identity modules, which are at least assigned to a first and a cellular network, wherein the user equipment has assigned an independent paging identity in each of the first and second cellular networks for registration in said cellular networks, the user equipment further being assigned to at least two paging groups, each of said paging group considering one of the at least two paging identities of the user equipment in said cellular networks, the method comprises the steps of:

- determining a paging timing for the user equipment for at least one of said cellular networks based on the respective paging groups,
- determining a value relating to a time difference between the first and second cellular network,
- informing the first of the at least two cellular networks about the paging identity used in the second cellular network and the value relating to the time difference between said cellular networks, retrieving an indication from said first cellular network relating to assignment to a paging group.

The inventive method relates to a user equipment for operating in cellular networks, in particular following the technology standard of 2G, 3G, 4G, 5G or beyond. The user equipment is operating with at least a base node of one of these cellular network which implements the resp. technology standard protocol.

The user equipment is equipped with a communication unit, comprising receiving and transmitting circuitry, like a transceiver, and is communicatively connected to at least two subscriber identity modules. Such subscriber identity modules hold access credentials for accessing at least one cellular network, in particular as home network. Such subscriber identity modules are in particular (U)SIM-cards, UICCs, eSIMs or soldered UICCs. The subscriber identity module can also comprise combination of built-in (e)UICC and pluggable USIM etc.

While the user equipment is equipped with one communication unit, but with two subscriber identity modules, it is generally able to be registered in two cellular networks at the same time, means camping on each a base node of the two cellular networks, each by means of the access credentials of the at least two subscriber identity modules. However the user equipment is not capable to exchange signals with both base nodes at the same time, as the base nodes are serving different frequency areas, and it requires some time for the transceiver to switch to the respective frequency areas.

Generally this approach is no problem for the user equipment and the involved cellular networks. However the user equipment is expected to be operative in the respective cellular network, when it is paged by the cellular network.

Paging is generally happening for submitting connection requests, like an incoming call, so that user equipment may react and indicate the call by a signal, like a ringtone, or directly handle the call, as it would be the case for a machine type communication (MTC) user equipment. The user equipment will wake up at the subframe where it expects its paging occasion and will read the paging messages. The paging messages contain the TMSI value. So if the UE does not find its TMSI inside the paging messages, it will assume that it is not paged, and it will go back to idle mode. However, if the UE finds it's TMSI in one of the paging messages, it will understand that the page is addressed to it and it will initiate a RRC Connection.

The parallel registration in two cellular networks poses a problem, when the paging cycles for both cellular networks are overlapping.

Generally each user equipment which is registered in a cellular network gets assigned a paging identity. This paging identity governs to which paging group a user equipment is assigned. The paging group depicts the time offset for a certain user equipment relative to a frame with a specific frame number. All user equipments which belong to the same paging group, are paged at a certain point in time. That means they have the same paging identity. Each paging group covers a certain time duration for paging, which is happening repeatedly.

The paging identity is typically determined by the calculation of the user equipment's IMSI (International Mobile Subscriber Identity) modulo 1024. The result is a value between 0 and 1023, which is the paging group. Starting from a system frame number (SFN) e.g. 0, an offset (in SFN diff) is calculated considering the paging group number and define the time, when the paging is supposed to happen, that means when the user equipment is expected to listen to potential paging messages.

It may happen that the user equipment has two subscriber identity modules with IMSIs which lead to the same modulo 1024-value. But even if this is not the case, there might be a time difference between the SFN0 of both involved cellular networks, that lead to an overlapping of the paging phases for the user equipment.

This is where the invention comes into play.

Hence it is suggested that for a user equipment with two subscriber identity modules, that a paging timing for the user equipment in at least one of the cellular networks is determined. This is happening based on the respective paging groups.

In other words: the user equipment figures out, in which paging groups it is operating per cellular network, and in consideration of the frame timing of both cellular networks if may come to a value relating to a time difference between the first and second cellular network.

Advantageously the user equipment has in particular available the respective information from the cellular network, either through broadcast or received as part of the registration procedure. The major paging parameters are transmitted through system information block 2 (SIB2).

Part of this is the number of paging subframes within a default paging cycle (NB), and the default paging cycle T. NB may have values of 2T, ½ T etc. This shows even with different NB, there may happen an paging overlapping paging between both involved cellular networks.

Consequently the user equipment will send an information element to at least one of the two cellular networks indicating about the paging identity in the other cellular network and an indication about the time difference between the paging of both cellular networks.

This approach is advantageous as it does not make available an IMSI or other private data from the one cellular network to the other. With the paging identity there is no way to identify the IMSI or any other personal data relating to the subscription in the other cellular network.

However with the timing difference and the paging identity the informed cellular network may come to a conclusion for sending an indication about an assignment to a paging group. When the timing difference is too close, the cellular network will most probably amend the assignment to the paging group.

This indication is received at the user equipment, memorized and after that taken into account for further paging occasions.

The paging group is in that case different from the paging group the user equipment would normally be in, according to the IMSI, that means different from the so-called nominal paging group, which is based on the paging identity. With that approach the user equipment may with low impact in terms of power consumption, signalling overload etc. adjust the paging in the cellular networks and continue to operate reliably with the cellular networks it is registered in.

Should a change in at least one cellular networks appear, e.g. when crossing the border of the cellular networks coverage area, the whole process is preferably repeated. That means it is checked again if the paging timing difference is too close, and hence request a paging group amendment from one cellular network.

When a cellular network is capable to support such inventive method, that means receiving the information about the paging difference and in response send an indication for a new assignment to a paging group, then such cellular network it rated as supporting paging coordination.

In a preferred embodiment it is suggested that the registering to that cellular network which is supporting paging coordination after registering to the cellular network not supporting paging coordination.

This is advantageous as the cellular network supporting paging coordination can then be asked for amendment of paging group, when it is detected a too close paging timing between both cellular networks. Only when registering in this order, means with the second cellular network supporting said feature, it can be applied. Means when the user equipment would first register to the cellular network supporting the feature and afterwards to the other, which can't shift paging, it would not help and paging could still overlap as the cellular network has no chance to move the paging.

So a user equipment which intends to register on two cellular networks reads on BCH first, if the cellular network indicates that it supports the feature. It is advantageous for the UE to first read the broadcast of the other cellular network, register to that one, regardless of the support of the paging coordination capability and afterwards register on the first cellular network according to the outlined method. The first cellular network supports the paging coordination resp. shifting feature and hence can avoid the overlapping.

According to another preferred embodiment it is proposed the step of regularly carrying out measurement activities for each of the two cellular networks, wherein said measurement activities in the two cellular networks is conducted in different timing relation to the paging.

This embodiment in particular relates to user equipments which are designed to optimize its power consumption, e.g. when operated with a battery which has an estimated long lifetime before being recharged or replaced. this is in particular the case in the MTC resp. IoT world, e.g. for metering devices, tracking equipment as well as in automotive area.

Such measurement in particular comprises the identification of neighbor cells in order to reselect in case the signals from the current base node are not receivable in acceptable signal strength anymore.

While the user equipment is designed to reduce its activity between the paging occasions it is consequently suggested, that such measurement that are regularly carried out, are timewise pushed in a timing relation to the paging occasion on the respective cellular network.

Consequently for a user equipment being registered to two cellular networks it is beneficial to have the paging occasion on the two cellular networks in proximity. Where proximity means a timing relation so that one paging and then the other paging can be received.

This embodiment anticipates that besides listening to paging occasions, other measurements need to be carried out by a user equipment. During said activity phase besides receiving the paging user equipments are also doing their measurements according to TS36.331 idle mobility i.e. activities be carried out once per DRX/eDRX cycle. However, the measurement duration or number of measurements to be carried out depends on each individual user equipment.

Even when the cellular network indicates in its broadcast the same amount of cells/frequencies to be measured the actual number a user equipment has to do can be different, depending on features supported or receiving level, i.e. only cells above a certain level are considered. Hence the required measurement time is not exactly predictable.

Hence it is a beneficial implementation that a user equipment a) performs measurements on the first cellular network according to the rules, b) receives paging on said first cellular network, c) receives paging on the second network (after switching, of course) d) performs measurements on said second cellular network.

By doing so the time needed between the paging occasion is just switching and synchronization time and hence independent from foreseen measurement activities.

In another preferred embodiment it is proposed that the assignment to another paging group is considering that the paging assignments in the at least two cellular networks are non-overlapping within a predetermined time proximity.

This embodiment is designed to lead to the situation, where the paging assignments in the first and second cellular network are timewise closer than paging assignment based paging identity in each cellular network. Hence it is not only the target of this embodiment to avoid an overlapping situation, but also to bring paging occasions closer together. When paging occasions are too far away from each other in the two cellular networks, the user equipment would be hindered to properly apply an uninterrupted deep sleep and save power consumption. To achieve this additional effect is the advantage of this embodiment. Moreover it does not require additional resources, signalling or power consumption to achieve that effect.

In particular in light of the previous embodiment it is beneficial to avoid an overlap of the paging occasions but have them in tight proximity so that the activity period on both cellular networks can be adjacent and afterwards having one uninterrupted long sleeping period.

This co-ordination of measurements and paging helps to reduce power consumption as then a longer sleep time is achieved.

A co-ordination of being aligned but non-overlapping is very advantageous for IoT devices i.e. listening for paging in the first network, doing other necessary actions (such as measurements) in said cellular network prior or after paging switching to the second cellular network listening to paging there and also doing related activities. If no paging is detected entering deep-sleep means minimum power consumption phase.

In addition is it advantageous for IoT devices with long paging duration not to overlap but to have paging in timely proximity to maximize power saving.

Additionally it is advantageous that the minimum time between two paging occasions in the two cellular network corresponds to switching and synchronization time required by the user equipment.

It is in particular independent of the amount of measurements a user equipment needs to perform in either of the cellular networks.

Preferably this minimum time is taken into account by the first cellular network when amending the paging group of the requesting user equipment.

With that embodiment it is assured that sufficient time is available between two paging occasions in two different cellular network, while on the other hand the mentioned desire not to spread pagings, and potentially additional measurement too long over a (e)DRX period in order to allow a longer deep sleep phase for the user equipment.

According to another preferred embodiment it is proposed that wherein the step of informing the first of the at least two cellular networks about the time difference includes at least one of:

a timing offset between said first and second cellular network with respect to starting of a frame, related to a preconfigured frame number, an indication relating to subcarrier spacing of the second cellular network, an indication relating to eDRX configuration for said user equipment, an indication relating to difference in paging configuration.

This embodiment relates to the information to the first of the two cellular network about timing differences. With that the cellular network is envisaged to be put into the position to figure out if and to what extent an amendment of the paging group assignment of the user equipment is useful.

For that the information might comprise one or more of the mentioned indications.

A first indication relates to the timing offset between the first and the second cellular network. This is in particular the SFN-/SFN timing offset in chips or subframes. The SFN is indicated in the MIB.

Another indication relates to the subcarrier spacing of the second cellular network, which is the other cellular network than that where the indication is sent to. The subcarrier spacing is in the technology standard of 5G/New Radio relating to the frame duration, which is variable. The subcarrier spacing SCS for a frequency range is invers towards the frame duration. Hence the other network needs to be informed about the applied SCS depending on the frequency part where the user equipment is receiving its paging.

As second indication an indication relating eDRX configuration of the user equipment in the second cellular network is provided to the first cellular network. Background is, that when a user equipment is operating in eDRX (enhanced discontinuous reception) then the cellular network needs to consider a so-called HyperSFN for paging. This obviously influences the duration in regards to the SFNs. Therefore it needs to be known by the first cellular network for evaluating a paging group amendment.

Additionally an indication relating to differences in paging configuration needs to be submitted. As set out before, paging configuration relates to the density and paging cycle values (NB and T). Apparently these influence the paging behavior as well and need to be considered by the addressed cellular network. According to another preferred embodiment it is proposed that the assignment to another paging group is indicated by an offset, said offset being related to either one of the following:

a paging group in the first cellular network,
a paging offset in frames related to the paging group in the second cellular network.

This embodiment relates to the assignment to another paging group and how it is instructed to the user equipment.

In a first option it is done by assigning to another paging group in the respective first cellular network. Preferably the nominal paging group is signaled, which might be a figure between 0 and 1023.

Alternatively an offset to the nominal paging group is signaled to the user equipment. This is in particular advantageous as it requires preferably less bits for signalling an offset of eg. 4 frames rather than 10 bits for a nominal paging group.

In a second aspect of the invention it is proposed an user equipment communicatively connected to at least two subscriber identity modules provided by at least two different cellular networks, after being assigned a paging identity in each of the at least two cellular networks, after registration in at least two of the group of cellular networks, comprising being assigned to a paging group by at least one of the at least two cellular networks, the user equipment is configured to:

determine paging timing from the at least two cellular networks based on the respective paging groups, considering the paging identity of the user equipment in said cellular network, determine a value relating to a time difference between the determined paging timings for the first and second cellular network, inform a first of the at least two cellular networks about the paging identity used in the second cellular network and the value relating to the time difference between said cellular networks, retrieve an indication from said first cellular network relating to assignment to a paging group.

This aspect relates to a user equipment for operating in cellular networks according to one or more of the technology standards of 2G, 3G, 4G, 5G or beyond.

The user equipment is equipped with a communication unit, in particular comprising transmitting and receiving circuitry, preferably a transceiver. If further comprises processing circuitry for controlling the transceiver and potential other components of the user equipment. Further the user equipment has a memory unit, either or both for permanent and volatile storage of data.

The user equipment is configured to be communicatively coupled to at least two subscriber identity modules, that means (U)SIMs, (e)UICCs, and other types of chip cards, either removable or soldered, or as part of another component like a baseband chip.

The concept of the user equipment is in particular known under the term DSSA: dual-SIM, single active, that meaning only one protocol stack, resp. transceiver.

The user equipment is therefore configured to operate within as much cellular networks in parallel as it comprises subscriber identity modules of different cellular network operators.

The second aspect of the invention shares the advantages of the first aspect of the invention.

According to the third aspect of the invention it is proposed a method for a cellular network capable of operating a plurality of user equipments, the method comprising the steps of:

receiving from one of the user equipment an indication relating to paging timing difference to a second cellular network, in case of overlapping paging:
determining a paging group having a timing offset to the currently assigned paging group,
sending a message to said user equipment indicating an information indicative of said determined paging group.

This aspect relates to the cellular network as involved in the procedure for allowing a user equipment to operating in two cellular networks and nonetheless do not miss pagings. This is advantageous for the cellular networks, as no paging occasions are made in vain as the user equipment shall be put into the position to receive the paging.

This aspect of the invention relates consequently to cellular networks which are capable to support paging coordination.

The procedure is therefore started by receiving an indication from a user equipment where it is indicated a paging timing difference between another cellular network, where the user equipment is operating in.

The cellular network, or at least a part of it, e.g. a base node, AMF or other components, figures out, if based on the retrieved information an overlapping of pagings for the requesting user equipment is happening.

For doing so according to a preferred embodiment it is suggests that it is further considered a predetermined time duration estimation for switching from said cellular network to a second cellular network.

This is to make sure that the user equipment shall be able to switch from one cellular network to the other cellular network and still be able to receive the paging messages.

When the overlapping situation is detected the cellular network is supposed to determine a paging group with a timing offset compared to the currently assigned paging group.

Hence the minimum time between two paging occasions applied by the cellular network is preferably taking into account the time required for switching and synchronization on the other cellular network. However it is independent of additional measurements.

Thus it can be assured that the paging occasions can be detected by the user equipment.

Additionally this way of paging coordination is advantageous as it allows the cellular network to coordinate the paging of the two cellular networks for the respective user equipment that way that they are timewise as close together as it is possible. That means the minimum time for switching governs the total time between the paging occasions in the at least two cellular networks.

With that the user equipment may have the chance to switch after the second paging—and potential additional measurements according to TS36.331—in a deep sleep mode which is uninterrupted for a remarkable time. This helps for a power consumption optimization of the user equipment.

Preferably this steps of determining the paging group further considers paging configuration difference between the cellular network and the second cellular network.

After determining a new paging group for the user equipment a message is sent to said user equipment which indicates this determined paging group change.

In another preferred embodiment it is proposed that the step of receiving an indication further comprises retrieving an indication relating to subcarrier spacing of the second cellular network, wherein the step of determining a paging group further considers the subcarrier spacing from the second cellular network in comparison to the subcarrier spacing of the first cellular network.

With this embodiment the cellular network receives an indication about the subcarrier spacing of the other cellular network, which is a needed information relating to the frame length.

Preferably other information as described for the first aspect of the invention are to be provided to the cellular network in order to assure that a proper determination of the amended paging group may be assigned.

In a preferred embodiment it is proposed that the cellular network is further indicating in broadcast capability to support paging coordination. This is preferably happening through an additional field in a System information block SIB.

With that the user equipment is put into the position to figure out if the cellular network supports paging coordination, meaning being in the position to do the steps according to this aspect of the invention.

Hence, when the user equipment is operating in two cellular networks where only one is indication the paging coordination capability, then it would turn to this cellular network for requesting an amendment of the paging group.

According to the fourth aspect of the invention it is proposed a cellular network capable of operating a plurality of user equipments, the cellular network being configured to:

receive from one of the user equipment an indication relating to paging timing difference to a second cellular network, in case of overlapping paging:
determine a paging group having a timing offset to the currently assigned paging group,
send a message to said user equipment indicating an information indicative of said determined paging group.

The fourth aspect of the invention shares the advantages of the third aspect of the invention.

As it is shown this invention advantageously solves the depicted problem and suggests a preferable collaboration of the user equipment and cellular network in order to assure that the user equipment is put into the position to receive paging in case of overlapping paging situation.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

Figure 1:
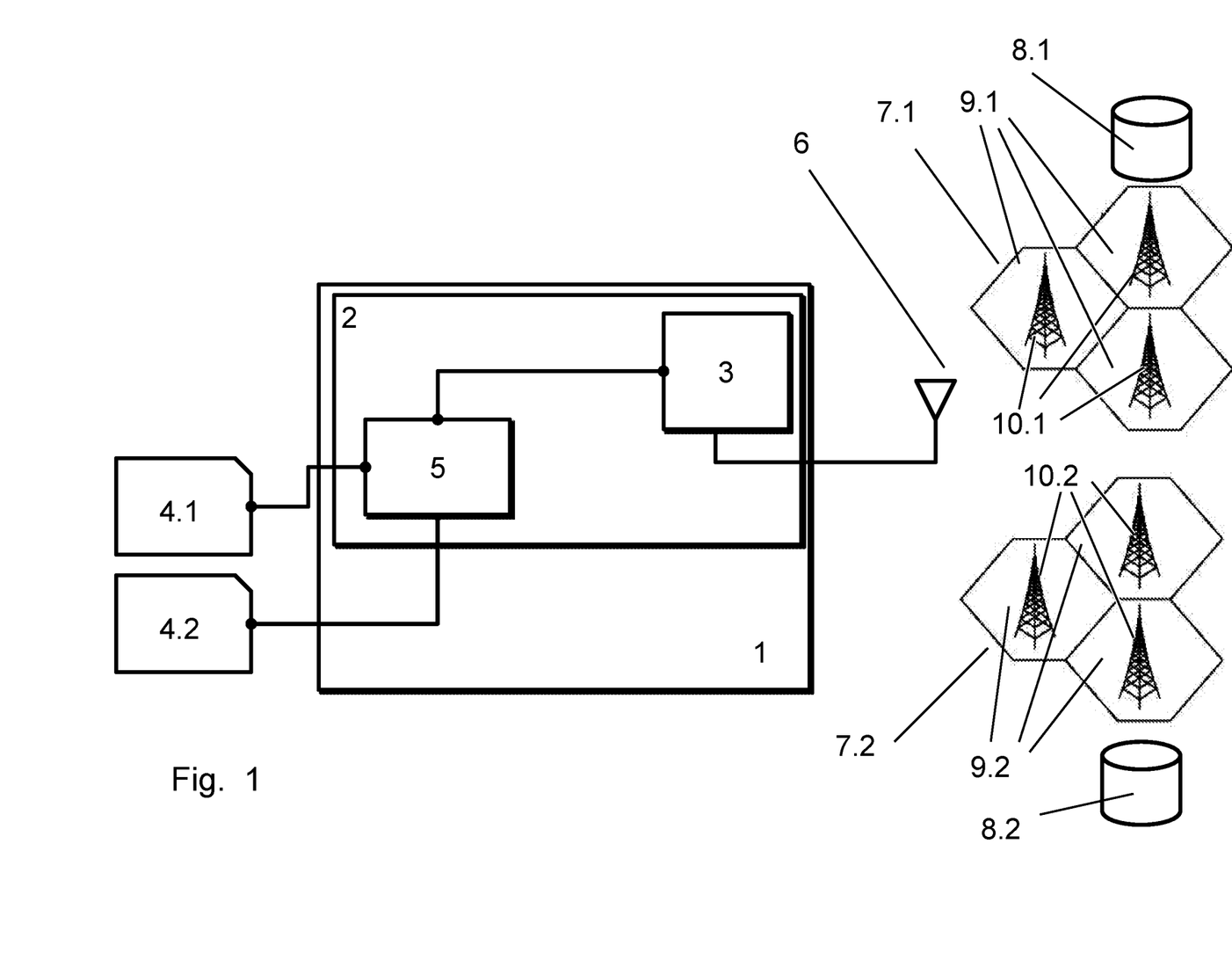
FIG. 1 represents a user equipment of the type to which the present invention is applied as an embodiment.

FIG. 1 schematically shows a user equipment 1 of the type to which the present invention is applied as an embodiment. The user equipment may be a mobile handset or an IoT device like a point-of-sale device, metering device, automotive unit, etc.

The user equipment 1 comprises a transceiver 3 and a protocol stack 5. Both are in particular part of a communication unit 2, e.g. a cellular modem which is coupled to the user equipment 1 via a call interface. Hence the user equipment 1 may via this call interface, e.g. an AT interface, control the activities of the cellular modem.

Additionally a first and a second subscriber identity module 4.1, 4.2 are coupled to the user equipment. They are directly accessible by the protocol stack 5. This architecture represents the DSSA approach, of double-SIM and Single active.

Via the antenna 6 the user equipment is capable of exchanging signals with base stations 10.1, 10.2 of at least two cellular networks 7.1, 7.2. Each base station covers a cell area 9.1, 9.2

Through the availability of the two subscriber identity modules 4.1, 4.2 the user equipment is capable of being registered in both cellular networks 7.1, 7.2. hence the user equipment is camping on two base stations, 10.1, 10.2 of the different cellular networks.

Figure 2:
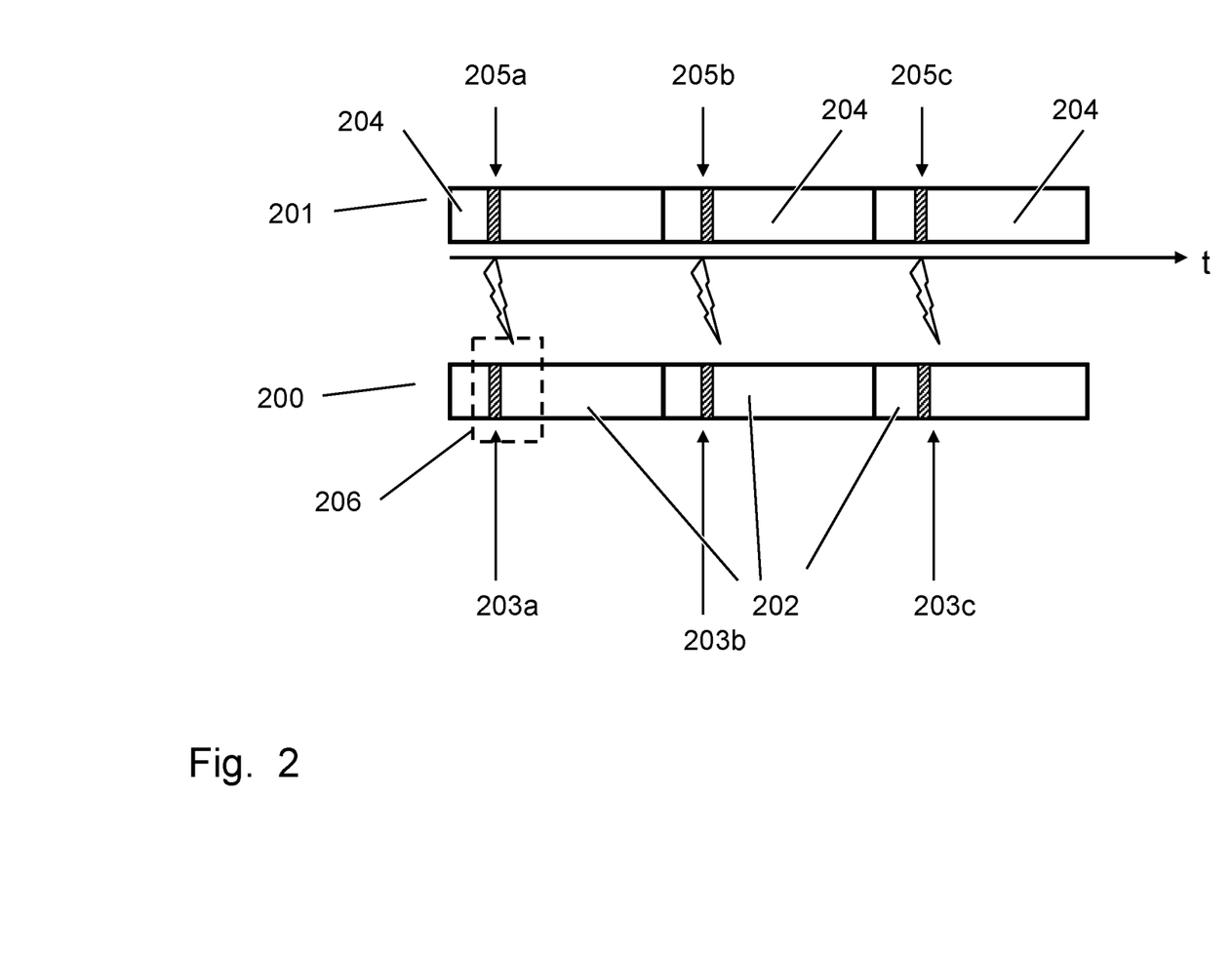
FIG. 2 schematically represents an exemplifying situation of paging overlapping.

FIG. 2 shows the paging problem for a user equipment in DSSA approach.

It is shown in a time graph the frame and paging structure 200, 201 of the first and second cellular network.

In a frame 202 of the first cellular network at a certain point in time, defined by an offset of the start of frame 202 the paging occasions 203a for a specific user equipment is supposed to happen. This is determined by the paging configuration and the paging group resp. identity the user equipment is assigned to. In other words, this paging occasion affects a couple of user equipments This paging occasion is happening repeatedly also in the next frames on paging occasions 203*b*, 203*c*.

During paging all members of a paging group retrieve paging messages, which they are expected to receive and decode. With a (temporary) identifier per message the user equipment which receives a paging message may determine if the paging message is dedicated for itself, and may take further steps, e.g. start a RRC connection.

For the second cellular network at a certain offset compared to the start of frame 204 the paging occasion 205*a* is happening. This is also governed by the paging configuration and assignment of the user equipment to a paging group, but as done by the second cellular network.

Depending on start of frame 204 and/or the offset for the paging occasion in dependence of the paging group it may happen, that the pagings in both cellular network are overlapping for this user equipment.

With dashed box 206 the overlapping zone is indicated. This overlapping zone in particular takes into account the duration for switching from one cellular network to the other, which involves a frequency jump of the transceiver.

Apparently it requires that at least for one cellular network a shift of the paging occasion is carried out for assuring that each paging occasion in both involved cellular networks is made by the user equipment.

Figure 3:
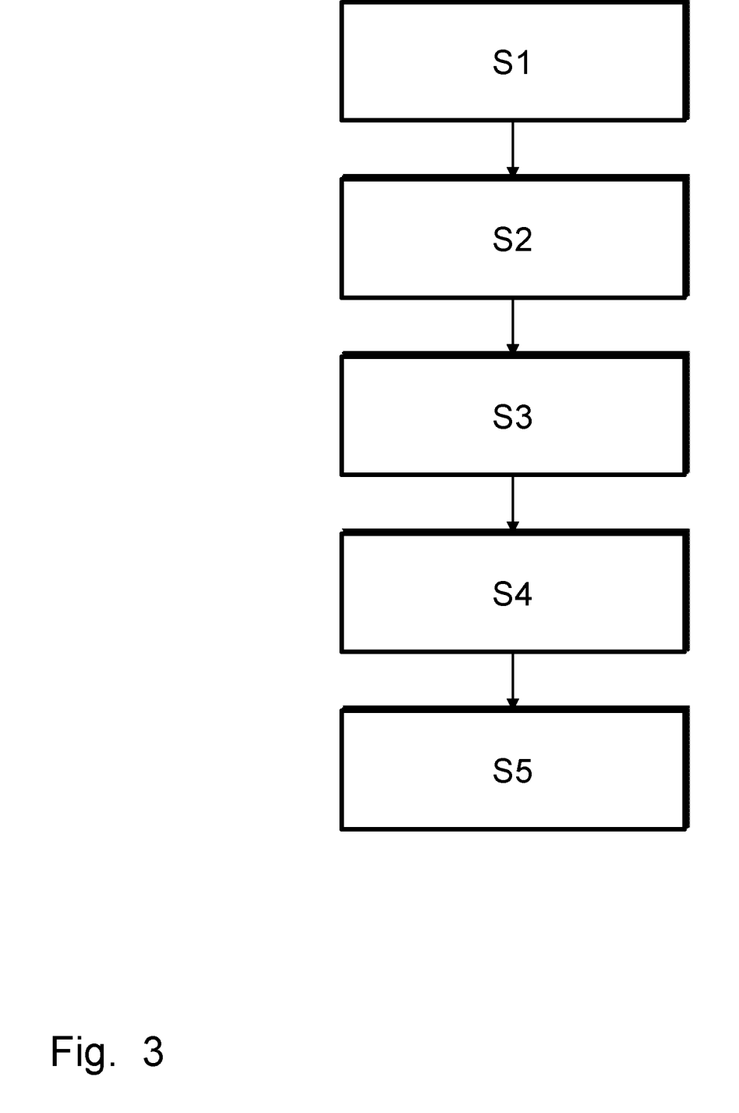
FIG. 3 shows an exemplifying embodiment of the inventive method by way of a flow chart.

This is achieved by the exemplary embodiment of the inventive method as shown in FIG. 3.

Here in step S1 the exemplifying user equipment which is registered in two cellular networks, determines that paging timing of the both cellular networks. Preferably this is happening short after being registered in the second cellular network, that means where it is registered later.

Based on this paging timing the user equipment is capable of calculating the timing difference between the paging in step S2.

The user equipment might be in the position to figure out that the paging timing is fine. If an overlapping is however detected or at least assumed the user equipment informs one of the both cellular networks about the timing difference and the paging identity in the other cellular network in step S3.

Further the user equipment might figure out that the paging difference is too large. This would cause problems with a deep sleep mode that shall be applied, in particular for IoT devices. hence also this finding might lead the user equipment to inform the cellular network about the timing difference of the paging of both cellular network.

Preferably the user equipment informs that cellular network, that indicates in the system information that it is supporting paging coordination.

The cellular network further may be equipped with additional information, like the paging configuration density and paging cycle, further information like subcarrier spacing of the other cellular network, and if the user equipment is operating in eDRX, hence a Hyper-SFN is applicable. As outlined earlier the Hyper-SFN is a multiplier (1-1024) which multiplied with the SFN allows for these large eDRX times.

In response the user equipment retrieves in step S4 from the cellular network an indication which indicates a new paging group within this cellular network.

That group assignment may be indicated by a nominal paging group or a paging group offset.

Finally in step S5 the user equipment applies the newly assigned paging group. With that the paging overlapping situation as indicated in FIG. 2 is resolved and the user equipment is able to retrieve the paging messages for its paging group on both cellular networks.

Further a too large timely distance between the paging occasion in both cellular networks may be avoided in order to allow the user equipment to apply a deep sleep phase which really assures power saving for the user equipment.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to operate a user equipment communicatively connected to at least two subscriber identity modules, which are at least assigned to a first and a cellular network, wherein the user equipment has assigned an independent paging identity in each of the first and second cellular networks for registration in said cellular networks, the user equipment further being assigned to at least two paging groups, each of said paging group considering one of the at least two paging identities of the user equipment in said cellular networks, the method comprises the steps of:

determining a paging timing for the user equipment for at least one of said cellular networks based on the respective paging groups, determining a value relating to a time difference between the first and second cellular network, informing the first of the at least two cellular networks about the paging identity used in the second cellular network and the value relating to the time difference between said cellular networks, retrieving an indication from said first cellular network relating to assignment to a paging group.

2. The method according to claim 1, further comprising the step of registering to that cellular network which is supporting paging coordination after registering to the cellular network not supporting paging coordination.

3. The method according to claim 1, further comprising the step of regularly carrying out measurement activities for each of the two cellular networks, wherein said measurement activities in the two cellular networks is conducted in different timing relation to the paging.

4. The method according to claim 1, wherein the assignment to another paging group is considering that the paging assignments in the at least two cellular networks are non-overlapping within a predetermined time proximity.

5. The method according to claim 1, wherein the step of informing the first of the at least two cellular networks about the time difference includes at least one of:

a timing offset between said first and second cellular network with respect to starting of a frame, related to a preconfigured frame number, an indication relating to subcarrier spacing of the second cellular network, an indication relating to eDRX configuration for said user equipment, an indication relating to difference in paging configuration.

6. The method according to claim 1, wherein the assignment to another paging group is indicated by an offset, said offset being related to either one of the following:

a paging group in the first cellular network, a paging offset in frames related to the paging group in the second cellular network.

7. A user equipment communicatively connected to at least two subscriber identity modules provided by at least two different cellular networks, after being assigned a paging identity in each of the at least two cellular networks, after registration in at least two of the group of cellular networks, comprising being assigned to a paging group by at least one of the at least two cellular networks, the user equipment is configured to:

determine paging timing from the at least two cellular networks based on the respective paging groups, considering the paging identity of the user equipment in said cellular network, determine a value relating to a time difference between the determined paging timings for the first and second cellular network, inform a first of the at least two cellular networks about the paging identity used in the second cellular network and the value relating to the time difference between said cellular networks, retrieve an indication from said first cellular network relating to assignment to a paging group.

8. The user equipment according to claim 7, further configured to register to that cellular network which is supporting paging coordination after registering to the cellular network not supporting paging coordination.

9. The user equipment according to claim 7, further configured to carry out regularly measurement activities for each of the two cellular networks, wherein said measurement activities in the two cellular networks is conducted in different timing relation to the paging.

10. The user equipment according to claim 7, wherein the assignment to another paging group is considering that the paging assignments in the at least two cellular networks are non-overlapping within a predetermined time proximity.

11. The user equipment according to claim 8, further configured that the information of the first of the at least two cellular networks about the time difference includes at least one of:

a timing offset between said first and second cellular network with respect to starting of a frame, related to a preconfigured frame number, an indication relating to subcarrier spacing of the second cellular network, an indication relating to eDRX configuration for said user equipment, an indication relating to difference in paging configuration.

12. A method for a cellular network capable of operating a plurality of user equipments (1), the method comprising the steps of:

receiving from one of the user equipment an indication relating to paging timing difference to a second cellular network, in case of overlapping paging:

determining a paging group having a timing offset to the currently assigned paging group, sending a message to said user equipment indicating an information indicative of said determined paging group.

13. The method according to claim 12, wherein the step of determining a paging group further considers paging configuration difference between the cellular network and the second cellular network.

14. The method according to claim 12, wherein the step of determining a paging group further considers a predetermined time duration estimation for switching from said cellular network to a second cellular network.

15. The method according to claim 12, wherein the step of receiving an indication further comprises retrieving an indication relating to subcarrier spacing of the second cellular network, wherein the step of determining a paging group further considers the subcarrier spacing from the second cellular network in comparison to the subcarrier spacing of the first cellular network.

16. The method according to claim 12, further indicating in broadcast capability to support paging coordination.

* * * * *